United States Patent [19]

Chapman

[11] 4,348,009
[45] Sep. 7, 1982

[54] LOAD PICKUP COUPLING DEVICE, LINE STRINGING APPARATUS AND METHOD

[76] Inventor: Claude L. Chapman, 3300 W. Union Ave., Englewood, Colo. 80110

[21] Appl. No.: 154,878

[22] Filed: May 30, 1980

[51] Int. Cl.$^3$ .............................................. B66D 1/36
[52] U.S. Cl. .......................... 254/134.3 R; 244/137 R; 258/1.2
[58] Field of Search ............... 254/134.3 R, 134.3 PA, 254/264, 389, 390; 258/1.2, 1.8, 22; 244/137 R, 118.1; 212/117

[56] References Cited

U.S. PATENT DOCUMENTS

| | | | |
|---|---|---|---|
| 800,135 | 9/1905 | Bostian | 258/22 |
| 1,581,674 | 4/1926 | Brown | 258/1.2 |
| 1,640,667 | 8/1927 | Osborn | 258/1.2 |
| 2,487,798 | 11/1949 | Griesinger et al. | 258/1.2 |
| 2,488,538 | 11/1949 | Hoehn et al. | 258/1.2 |
| 2,663,748 | 12/1953 | Carr et al. | 254/134.3 R |
| 3,601,342 | 8/1971 | Piasecki | 244/137 R |
| 3,845,937 | 11/1974 | Johnson et al. | 258/1.8 |
| 4,006,884 | 2/1977 | Lederhos et al. | 254/134.3 PA |
| 4,124,181 | 11/1978 | Kolwey | 244/137 R |
| 4,247,084 | 1/1981 | Lindsey et al. | 254/134.3 PA |

FOREIGN PATENT DOCUMENTS 2648255 5/1977 Fed. Rep. of Germany ... 254/134.3 PA

Primary Examiner—Galen L. Barefoot
Attorney, Agent, or Firm—Ancel W. Lewis, Jr.

[57] ABSTRACT

The problem of readily picking up a load using an aircraft without requiring ground personnel is solved by a coupling device (15) and a method of coupling a load using same. The coupling device includes a pivot member (17) pivotally mounted on the load having a disposition and configuration that is readily engaged by a hoist line (42) with an end or weight member (43) from above and guided into a retainer portion (22) so that as the hoist line is raised a connection is formed between the hoist line and the load. The pivot member serves as a load-bearing member during suspension. Upon deployment and relief of the weight of the load from the hoist line, the pivot member automatically returns to the starting position and the hoist line and end member are slid therefrom. Stringing apparatus inclusive of a support member (72) carrying front and rear coupling devices (15) and front and rear tower catches (75 and 76) is particularly effective in stringing line through the tower in accordance with a novel method of line stringing.

13 Claims, 15 Drawing Figures

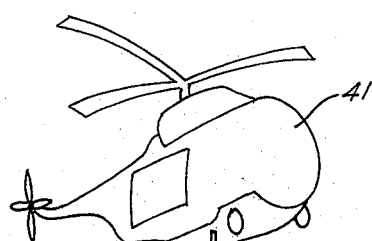
FIG. 6
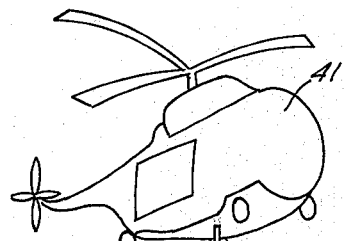
FIG. 7
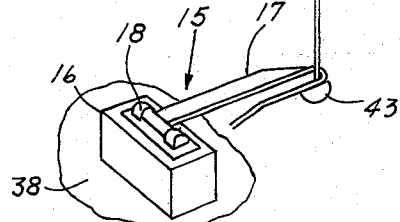
FIG. 8
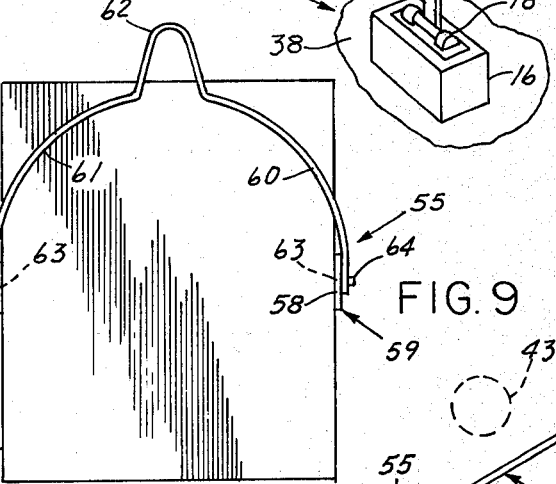
FIG. 9
FIG. 10
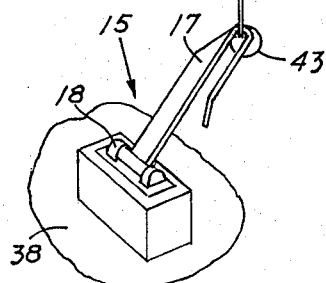

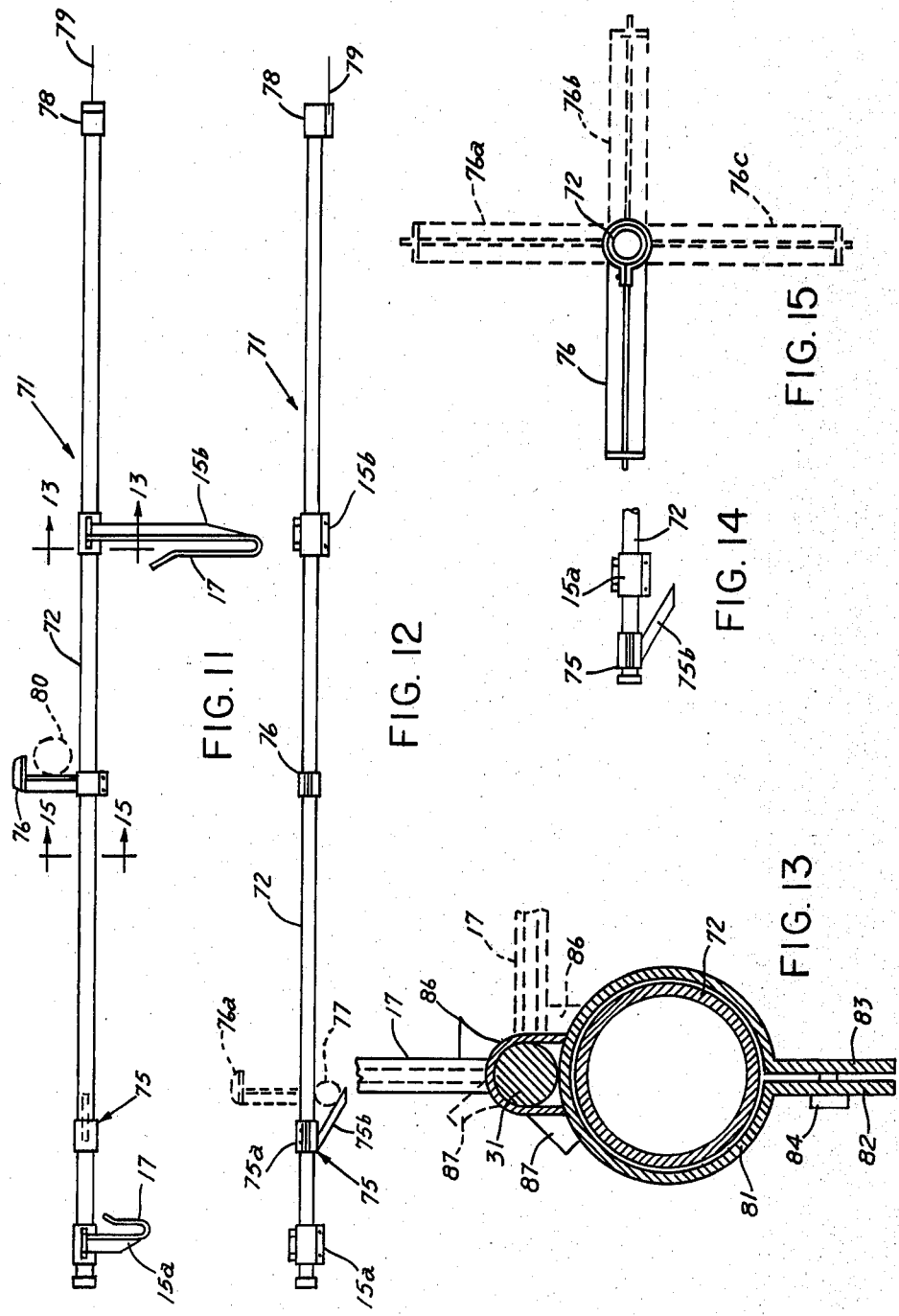

LOAD PICKUP COUPLING DEVICE, LINE STRINGING APPARATUS AND METHOD

TECHNICAL FIELD

This invention generally relates to load pickup coupling devices suitable for the retrieval of a load from above by an aircraft and coupling devices and methods that are particularly well suited for use in the airborne stringing of a line through line-holding structure on a power line.

BACKGROUND ART

The helicopter has many advantages for moving different types of loads from place to place and is particularly effective in retrieving and moving loads in remote or inaccessible areas. One problem encountered in airlifting loads using this aircraft with a depending hoist line is the connecting of the lower end of the hoist line to the load. In the past the most common practice has been to use a grappling hook or some other type of hook on the end of a hoist line to hook into the load or a cable attached to the load. In most cases ground personnel is used to make certain there is a reliable connection between the hoist line and the load.

In many aerial load pickup situations it is also highly desirable to be able to readily release the load from the hoist line without ground personnel. An example of the requirements of this type of coupling is disclosed in my copending application Ser. No. 103,348, entitled "Apparatus and Methods for Line Stringing", wherein a needle-like structure is carried by the hoist line suspended from a helicopter to thread the line through tower supported line-holding structure and particularly a tower with line-holding structure that has no side access such as for stringing the center line.

Accordingly, it is an object of the present invention to provide a novel and improved load pickup coupling device between a hoist line and a load that may be applied generally to load pickups from an aircraft, the methods related thereto, and more particularly to the stringing of a sock line associated with stringing electric power lines.

DISCLOSURE OF INVENTION

In accordance with the present invention there is disclosed a load pickup coupling device and method for use in retrieving a load by a helicopter and like aircraft which includes a pivot member shown in the form of a hook-like structure or a bail-like structure defining a central receiving area disposed in a substantially horizontal plane. The hook-like pivot member is pivotally mounted to pivot relative to the load about a horizontal axis from a generally prone position to an upright suspended position.

The configuration and disposition of the pivot member is such that a hoist line with an enlarged end member or weight below the pivot member may pass into the receiving area and into a retainer portion defining an internal retainer area that is smaller than the end member and arranged so that as the hoist line and end member are raised by the aircraft the end member engages the retainer portion, the pivot member is pivoted to an upright position, and a load-bearing connection is established between the hoist line and load. When the weight of the load is supported by something other than the hoist line, the pivot member pivots back to the horizontal position and the hoist line and end member slide from the retainer portion and out through the receiving area of the pivot member.

This coupling device on a line stringing needle provides for a ready connection and disconnection to a hoist line carried by an aircraft for stringing a sock line associated with power lines.

BRIEF DESCRIPTION OF DRAWINGS

The details of this invention will be described in connection with the accompanying drawings, in which:

FIG. 6 is a pictorial view of the deployment of a helicopter with a hoist line having an end member on the lower end for engaging the coupling device shown in FIG. 1;

FIG. 7 is a pictorial view of the load being carried by the helicopter via the coupling device;

FIG. 8 is a pictorial view of the load in a ground-supported position with the pivot member moving with the end member extending back toward a horizontal position prior to release of the end member and hoist line from the device;

FIG. 9 is a top plan view of another form of aerial coupling device embodying features of the present invention;

FIG. 10 is a side elevation view of the device shown in FIG. 9;

FIG. 11 is a top plan view of a line stringing apparatus using two of the coupling devices above described;

FIG. 12 is a side elevation view of the device shown in FIG. 6;

FIG. 13 is an enlarged sectional view taken along lines 13—13 of FIG. 12;

FIG. 14 is a side elevation view of another arrangement for the front coupling device and front catch; and FIG. 15 is a sectional view taken along lines 15—15 of FIG. 11 with alternate positions for the rear catch shown in dashed lines.

DETAILED DESCRIPTION

Figure 1:
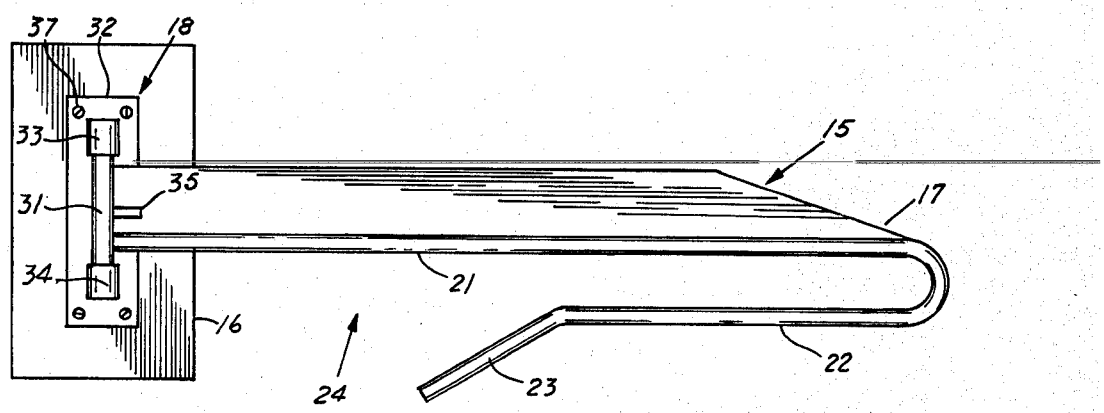
FIG. 1 is a top plan view of a coupling device embodying features of the present invention.
Figure 2:
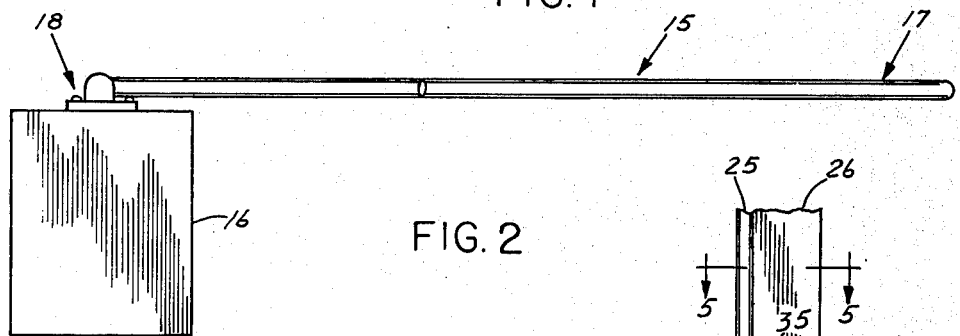
FIG. 2 is a side elevation view of the coupling device shown in FIG. 1.
Figure 3:
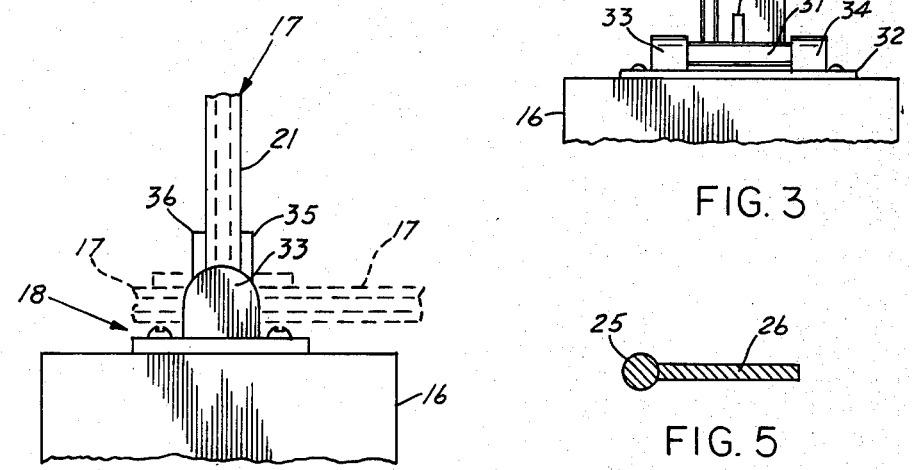
FIG. 3 is an enlarged end elevation view of a portion of the coupling device shown in FIG. 1 with the pivot member upright.
Figure 4:
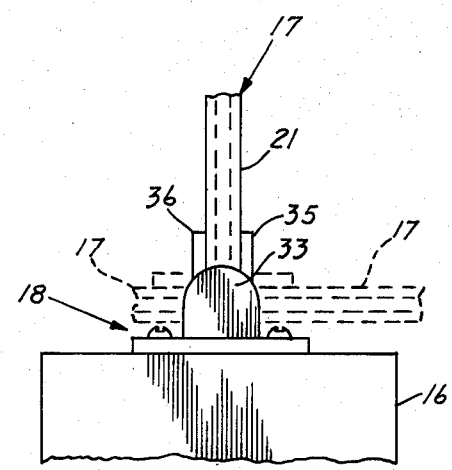
FIG. 4 is an enlarged side elevational view of the pivot assembly of FIG. 2.
Figure 5:
FIG. 5 is a sectional view taken along lines 5—5 of FIG. 3.

Referring now to the drawings, a load pickup coupling device 15 shown is mounted on a load 16 represented in a general form as a rectangular block. This coupling device 15, generally stated, has a single hook-shaped pivot member 17 pivotally connected at one end to the top of the load by a pivot assembly 18 to pivot about a substantially horizontal axis between selected positions described hereinafter.

The pivot member 17 shown is comprised of a shank portion 21 and a U-shaped retainer portion 22 with an outwardly flared end portion 23 opposite assembly 18 which define an interior receiving area with a receiving opening 24 for the line along one side opposite the shank portion and between the end of the end portion 23 and the load. This configuration for the pivot member and the fact that it is disposed substantially on its side in a prone position as shown in FIG. 1 provides a load-supported, line-engaging target area for the hoist line.

In practice the hoist line and end member are moved by the aircraft and engage the pivot member so that its external edge assists in guiding the hoist line toward the opening in the hook between the flared end portion and the load. The outwardly flared end portion facilitates guiding of the hoist line into the opening in the hook and against the inner edge of the shank portion, which then serves as a line-engaging target area for the hoist line and guides the hoist line into the retainer portion 22. The retainer portion 22 is larger than the cross section of the hoist line and smaller than the cross section of the end member carried by the hoist line. Once carried by the hoist line, the pivot member 17 and its pivotal connection at the assembly 18 become load-bearing or load-supporting members between the hoist line and load.

The pivot member 17 shown is made of a solid rod 25 of circular cross section with a reinforcing plate 26 that extends along the shank portion and one side of the retainer portion for added strength.

The pivot assembly 18 for the pivot member 17 includes a transverse pivot rod 31 affixed to the end of the shank portion opposite the retainer portion adapted to rotate about a horizontal axis, together with a mounting plate 32 which carries a pair of sleeve bearings 33 and 34 affixed thereto. The pivot rod 31 is telescopically received in and retained at opposite ends by the sleeve bearings 33 and 34.

A horizontal stop 35 is carried by the shank portion and engages the mounting plate 32 to hold the pivot member 17 in the horizontal position on one side, and a horizontal stop 36 is mounted on the opposite side of the pivot member to hold the pivot in a horizontal position when swung to an opposite position as shown in dashed lines. It is understood that the stops 35 and 36 may be shaped to position the pivot member at an upward incline to the horizontal if desired, but in most cases this angle would be small and would not exceed 45°. Screw fasteners 37 are shown holding the mounting plate to the load. While a mounting plate is shown, it is understood that other fastening techniques may be used to fasten the pivot assembly 18 to the load and other forms of pivots may be used to pivotally mount the pivot member 17 to a load.

Referring now to FIGS. 6-8, the load 16 with a coupling device 15 mounted thereon, as above described, is shown on a supporting surface 38. A helicopter-type aircraft 41 has a hoist line 42 suspended thereon with an end member 43 in the form of a ball forming a weight on the lower end. Shapes other than spherical could be used.

The helicopter positions the end member 43 below the pivot member and the line 42 is moved toward the shank portion 21 through the receiving opening 24, usually against the inner edge of the shank portion wherein it is guided thereby into the retainer portion 22. The end member 43 is then raised against the retainer portion and at the same time the pivot member swings up about the pivot and forms a connection between the load and the helicopter so that the helicopter may elevate the load, as shown in FIG. 7.

To release the load from the hoist line, upon the placement of the load on a support surface the pivot member will tend to swing in the direction of the end member 43 and lie back down to the horizontal position, whereupon the end member 43 may be slid from the retainer portion and out the receiving opening of the hook in reversal of motion to that of its application.

In FIGS. 9 and 10 there is shown another form of coupling device 55 including a pivot member 57 and a pivot assembly 59 connected at each end to the load 16. Pivot member 57 is in the nature of a modified U-shaped bail comprised of a pair of oppositely disposed, spaced, arcuate shank portions 60 and 61, each pivotally connected at one end to the load and connected at the opposite end to a U-shaped retainer portion 62. The shank portions 60 and 61 form a receiving area through which the end member will insert and the inside edges guide the hoist line into the retainer portion. Again the retainer portion 62 is smaller in size than the end member to form the connection.

The pivot assembly 59 at each end is shown to include a mounting plate 58 held to the load as by bolt fasteners with a pivot stud 63 extending through a hole in the end of the shank portion having a retainer head 64. Suitable stops 65 are provided on each shank portion to dispose the pivot member at an angle to the horizontal, preferably of about 30° but usually not more than 45°. The angular position allows the hoist line and end member to be moved into the receiving area toward the retainer portion 62 from the side. This configuration for member 57 provides a generally wider target area for the hoist line and end member.

The operation of the coupling device 55 is similar to that of device 15 above described and the interior receiving area formed by the pivot member must be large enough for the end member on the hoist line to be moved into the receiving area from the side toward the retainer portion 62. The width of the retainer portion 62 allows the line to slide thereinto and engage the end member when it is pulled up against same.

The line stringing apparatus 71 shown in FIGS. 11–13 is of the general type and similar in operation to that shown and described in my above-mentioned co-pending application and includes a support member 72 in the form of an elongated cylindrically shaped rod, a front hoist line fastener or coupling device 15a attached at the front end of the support member 72, and a rear hoist line fastener or coupling device 15b attached to the support member 72 between the ends thereof a selected distance behind coupling device 15a.

The stringing apparatus further has a front tower catch 75 adjacent to and rearwardly of the front coupling device 15a and a rear tower catch 76 forwardly of the rear coupling device 15b. A line fastener 78 is connected to the rear end of the support member for fastening the sock or pull line 79 to the support member 71. The line fastener 78 has a mounting bracket clamped to the support member 71 and a clevis held by the fastening bolts. The sock line 79 is secured to the clevis.

Coupling devices 15a and 15b are of a construction similar to device 15 above described and differ from one another only in the relative proportions of the shank portion and retainer portions. The front coupling device is shorter for added strength. As shown in FIG. 13, each of these coupling devices 15a and 15b has a pipe-clamp-type circular mounting bracket 81 that fits around the support member 72 and has flange plates 82 and 83 through which one or more bolt fasteners 84 pass to releasably clamp the coupling device to the support member at the desired position. This allows the member to be located at any position along the support member and be adjustably moved as required.

The pivot member carries a stop 86 to hold it in the horizontal position and a stop 87 to hold it in the upright position or at any desired angular position in between. For some applications the stops enable the pivot member to swing a full 180°, as is shown in FIG. 1.

The front tower catch 75 includes a releasable and slidable mounting bracket portion 75a similar to bracket 81 above described to permit this catch to be slidable along the support member 72 and located at a selected position by tightening the bolt fasteners that extend through the flanges of the bracket, together with a rearwardly and downwardly inclined hooking arm portion 75b adapted to hook over the top of the cross support on the tower designated by dashed lines at 77. The front tower catch 75 may also be located forwardly of the front coupling device 15a, as shown in FIG. 14.

The rear tower catch 76 includes a releasable and slidable mounting bracket portion similar to bracket 81 above described and has an outwardly and rearwardly extending arm portion provided with flat surfaces that are particularly suited for engaging wood. The rear tower catch 76 shown in FIGS. 11 and 15 extends laterally out from one side of the support member 72 opposite the normal position for the pivot member 17 and is positioned for a side hookup with the upright side pole of a support tower indicated at 80.

The rear tower catch 76 may be disposed at the opposite side at 76b, on top as indicated at 76a, or on the bottom as indicated at 76c with respect to the support member, as shown in dashed lines in FIG. 15, depending on the type of tower engagement or hookup required. The upstanding or top disposition indicated at 76a with the catch located forwardly and adjacent catch 75, as shown in dashed lines in FIG. 12, is particularly suited for having the catch engage the underside or bottom of a cross support 77 on a tower.

A preferred procedure for stringing a sock line through the line-holding structure of a tower that has no side access, such as the center line, using line stringing apparatus 71 above described, is as follows:

The end member or ball 43 on the end of the hoist line is placed in the front coupling device 15a and the line stringing apparatus 71 is moved in by the aircraft and set on the top of the cross support 77 of the tower or other support structure with arm portion 75b hooked on support 77 and the sock line 79 providing a tension to hold apparatus 71 in place. The line and end member are removed from the front coupling device 15a and connected to the rear coupling device 15b, which is the loaded position ready for threading.

The line stringing apparatus 71 is then lifted off the tower, backed up and threaded through the tower by manipulating the aircraft. The top front catch 76a may hook the bottom of the tower or the side mount front catch may hook the side of the tower, according to the type of tower, and the stringing apparatus is again supported by the tower. The end member 43 is decoupled from the rear coupling device 15b and hooked into the front coupling device 15a and the line 79 is threaded through the tower and moved down to the next tower by the aircraft, where the front catch is again set on the top cross support 77 and the above procedure is repeated.

Although the present invention has been described with a certain degree of particularity, it is understood that the present disclosure has been made by way of example and that changes in details of structure may be made without departing from the spirit thereof.

What is claimed is:

1. Stringing apparatus comprising:
a hoist line carried by an aircraft;
an elongated threading member having a leading end and a trailing end arranged to be passed through a window-like line-holding structure on a tower while suspended from above by said hoist line;
a threading line connected to said threading member rearwardly of said leading end;
a coupling between said hoist line and said threading member having interfitting, releasable, male and female coupling portions, one of said coupling portions being connected to the lower end of said hoist line and the other of said coupling portions being asscociated with said threading member to suspend said threading member from said hoist line and to releasably connect said threading member to said hoist line for the directed movement of said threading member through said structure while suspended from above, said other coupling portion including a leading coupling part at a forward position on said threading member and a trailing coupling part rearwardly of and spaced from said leading coupling part; and
tower catch means for said threading member releasably fastening said threading member to said tower after said hoist line is released from said threading member, said tower catch means including a front tower catch rearwardly of said leading coupling part and a rear tower catch forwardly of said trailing coupling part, said hoist line being first coupled to said leading coupling part and said front tower catch engaging the tower, the hoist line being released from said leading coupling part and coupled to said trailing coupling part for the movement of the leading end of said threading member and leading coupling part through said structure, said rear tower catch engaging the tower, said hoist line being released from said trailing coupling part and coupled to said leading coupling part, said threading member and threading line being moved through said structure while suspended from said aircraft.

2. Stringing apparatus as set forth in claim 1 wherein said coupling portion on said hoist line is a ball-like end member, and wherein at least one of said coupling parts includes pivot means pivotally connected to pivot relative to said threading member and disposed in a first position and arranged to pivot about a substantially horizontal axis between the first position and a second position, said pivot means defining an internal receiving area for said hoist line, said pivot means having an elongated shank portion pivotally connected at one end to pivot relative to said threading member and a retainer portion extending beyond said shank portion opposite said pivotal connection for receiving the hoist line whereby, after the hoist line is passed into said receiving area with the end member below said pivot means and said hoist line is moved into said retainer portion, the upward movement of said end member against the retainer portion by upward forces applied to said hoist line raises the pivot means to the second position, forming a connection at said hoist line and pivot means.

3. Stringing apparatus as set forth in claim 2 wherein said pivot means is in the form of a single hook-like pivot member including a rod of generally circular cross section having a reinforcing place along said shank portion and an adjacent portion of the U-shaped bend of the hook for added strength.

4. Stringing apparatus as set forth in claim 2 wherein said pivot means has an outwardly flared end portion opposite its pivotal connection to said threading member to facilitate the movement of the hoist line into said retainer portion.

5. Stringing apparatus as set forth in claim 2 wherein the pivotal connection for said pivot means includes a transverse rod on the end of said shank portion and at least one sleeve-type bearing telescoped over said transverse rod, said bearing being connected to said threading member.

6. Stringing apparatus as set forth in claim 2 wherein said pivot means is in the form of a bail-like pivot member disposed at an angle to the horizontal and having a pair of opposed, spaced, shank portions each pivotally mounted at one end and joined by a substantially U-shaped retainer portion at the opposite end, said pivot member defining an interior receiving area for a hoist line and end member, the U-shaped section being smaller in size than the end member and larger in size than said hoist line to slidably receive said hoist line from the side of said pivot member.

7. Stringing apparatus as set forth in claim 2 wherein said pivot means forms a line-engaging target area and an interior receiving area for the hoist line, said shank portion having an inner edge opposite a receiving opening in the hook for guiding the hoist line into a U-shaped retainer portion of the hook.

8. Stringing apparatus as set forth in claim 2 whereby, upon the subsequent supporting of the load by other than the hoist line, the pivot means automatically returns to the first position and the hoist line and end member are removed from a connection to the pivot means by passage back through said receiving area.

9. Stringing apparatus comprising:
a hoist line carried by an aircraft;
an elongated threading member having a leading end and a trailing end arranged to be passed through a window-like line-holding structure on a tower while suspended from above by said hoist line;
a threading line connected to said threading member rearwardly of said leading end;
a coupling between said hoist line and said threading member having interfitting, releasable, male and female coupling portions, one of said coupling portions being connected to the lower end of said hoist line and the other of said coupling portions being associated with said threading member to suspend said threading member from said hoist line and to releasably connect said threading member to said hoist line for the directed movement of said threading member through said structure while suspended from above, said other coupling portion including a leading coupling part at a forward position on said threading member and a trailing coupling part rearwardly of and spaced from said leading coupling part; and
tower catch means for said threading member releasably fastening said threading member to said tower after said hoist line is released from said threading member, said tower catch means including a front tower catch forwardly of said leading coupling part and a rear tower catch between said leading and trailing coupling parts, said hoist line being first coupled to said leading coupling part and the front tower catch engaging the tower, the hoist line being released from said leading coupling part and coupled to said trailing coupling part for the movement of the leading end of said threading member and leading coupling part through said structure, said rear tower catch engaging the tower, said hoist line being released from said trailing coupling part and coupled to said leading coupling part, said threading member and threading line being moved through said structure while suspended from said aircraft.

10. Stringing apparatus as set forth in claim 9 wherein said threading member is in the form of an elongated rod-like member, said coupling parts and tower catches being releasably clamped to said threading member to be rotated to any angular position and located at a selected position along said threading member.

11. Stringing apparatus as set forth in claim 9 wherein said front tower catch is in the form of a rearwardly and downwardly inclined arm adapted to rest on and engage an upper cross support of a tower and be held in place by the tension on said stringing line.

12. A method of aerially stringing a threading line comprising:
suspending a hoist line from an aircraft;
providing an elongated threading member having a leading end and a trailing end arranged to be passed through a window-like line-holding structure on a tower while suspended from above by said hoist line, a threading line being connected to said threading member rearwardly of said leading end;
coupling a coupling portion on the lower end of said hoist line to a leading coupling part associated with said threading member to suspend said threading member from said hoist line and to releasably connect said threading member to said hoist line;
engaging the tower with a front tower catch associated with said threading member for releasably fastening said threading member to said tower after said hoist line is released from said threading member;
releasing said hoist line from said leading coupling part and coupling said coupling portion to a trailing coupling part associated with said threading member;
directing the leading end of said threading member and a leading coupling part on said threading member through said structure;
releasably fastening said threading member to said tower with a rear tower catch associated with said threading member;
releasing said hoist line from said trailing coupling part and connecting it to said leading coupling part; and
moving said threading member and said threading line through said structure while suspended from said hoist line.

13. A method as set forth in claim 12 wherein said coupling to and decoupling from the threading member are provided by an enlarged end member on the lower end of the hoist line and a coupling device including a hook-like pivot member connected to the threading member that is engaged by the hoist line and end member by the aircraft from above to form a connection between the hoist line and threading member.

* * * * *